(12) United States Patent
Zhang et al.

(10) Patent No.: US 12,082,245 B2
(45) Date of Patent: Sep. 3, 2024

(54) LISTEN BEFORE TALK WIRELESS COMMUNICATION ENHANCEMENTS

(71) Applicant: ZTE CORPORATION, Guangdong (CN)

(72) Inventors: Li Zhang, Shenzhen (CN); Eswar Kalyan Vutukuri, Shenzhen (CN); Yajun Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 380 days.

(21) Appl. No.: 17/386,254

(22) Filed: Jul. 27, 2021

(65) Prior Publication Data

US 2021/0352721 A1 Nov. 11, 2021

Related U.S. Application Data

(63) Continuation of application No. PCT/CN2019/075108, filed on Feb. 14, 2019.

(51) Int. Cl.
*H04W 74/0808* (2024.01)
(52) U.S. Cl.
CPC .............................. *H04W 74/0808* (2013.01)
(58) Field of Classification Search
CPC ................................................ H04W 74/0808
See application file for complete search history.

(56) References Cited

U.S. PATENT DOCUMENTS

| 9,730,249 B2 * | 8/2017 | Jha ........................ H04W 76/10 |
| 11,064,537 B2 * | 7/2021 | Zhang ............... H04W 74/0841 |
| 2010/0322172 A1 | 12/2010 | Hsu |
| 2012/0307767 A1 * | 12/2012 | Yamada ................ H04W 74/02 370/329 |
| 2016/0135155 A1 | 5/2016 | Al-Shalash et al. |
| 2018/0205516 A1 | 7/2018 | Jung et al. |
| 2018/0279186 A1 | 9/2018 | Park et al. |
| 2018/0324677 A1 * | 11/2018 | Mallick ................ H04W 72/21 |
| 2021/0227587 A1 * | 7/2021 | Tsai .................... H04W 74/006 |

(Continued)

FOREIGN PATENT DOCUMENTS

| CA | 3049040 A1 | 7/2018 |
| CN | 105519214 A | 4/2016 |

(Continued)

OTHER PUBLICATIONS

Extended European Search Report for EP Appl. No. EP 19915159.8, dated Feb. 10, 2022 (8 pages).

(Continued)

*Primary Examiner* — Ajay Cattungal
(74) *Attorney, Agent, or Firm* — Foley & Lardner LLP

(57) ABSTRACT

A method of wireless communication includes selecting, based on a field in a message received by a wireless device, an access procedure mode for accessing a wireless network upon occurrence of a condition and performing, by the wireless device upon occurrence of the condition, the access procedure according to the access procedure mode for accessing the wireless network. In some embodiments, the disclosed techniques may be used to improve the performance of a wireless network by reducing number of listen-before-talk attempts that devices have to make before successfully accessing the wireless network.

20 Claims, 9 Drawing Sheets

(56) References Cited

U.S. PATENT DOCUMENTS

2022/0086765 A1* 3/2022 Zhang .................. H04W 52/50
2022/0095379 A1* 3/2022 Xiong ............... H04W 74/0833

FOREIGN PATENT DOCUMENTS

| CN | 106664700 A | 5/2017 |
|----|-------------|--------|
| WO | WO-2017/105306 A1 | 6/2017 |
| WO | WO-2018/085726 A1 | 5/2018 |
| WO | WO-2018/126418 A1 | 7/2018 |
| WO | WO-2018/127042 A1 | 7/2018 |

OTHER PUBLICATIONS

Ericsson: "Handling of RA counters and timers in NR-U" 3GPP TSG-RAN WG2 #104; TDoc R2-1817968; Nov. 16, 2018 (3 pages).
International Search Report and Written Opinion for PCT Appl. No. PCT/CN2019/075108, mailed Oct. 29, 2019 (9 pages).
ZTE: "consideration on SR enhancement for NR-U operation" 3GPP TSG RAN WG2 NR #104 Meeting; R2-1816833; Nov. 16, 2018; Spokane, US (2 pages).
First Office Action for CN Appl. No. 201980092198.1 dated Mar. 30, 2023 (received Apr. 21, 2023, with English translation, 10 pages).
Second Office Action for CA App. No. 3128784 dated Dec. 1, 2023 (6 pages).
Rejection Decision for CN App. No. 201980092198.1 dated Feb. 27, 2024 (with English translation, 13 pages).
First Office Action for EP Appl. No. 19915159.8, dated Mar. 1, 2024 (6 pages).

* cited by examiner

LISTEN BEFORE TALK WIRELESS COMMUNICATION ENHANCEMENTS

CROSS-REFERENCE TO RELATED APPLICATION

This application claims the benefit of priority under 35 U.S.C. § 120 as a continuation of PCT Patent Application No. PCT/CN2019/075108, filed on Feb. 14, 2019, the disclosure of which is incorporated herein by reference in its entirety.

TECHNICAL FIELD

The present document relates to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved bandwidth performance are being discussed.

SUMMARY

The present document describes techniques that can be used in various embodiments for improving listen before talk mechanism.

In one example aspect, a method of wireless communication is disclosed. The method includes selecting, based on a field in a message received by a wireless device, an access procedure mode for accessing a wireless network upon occurrence of a condition, and performing, by the wireless device upon occurrence of the condition, the access procedure according to the access procedure mode for accessing the wireless network.

In another example aspect, another method of wireless communication is disclosed. The method includes maintaining, at a physical layer of a wireless device, a count of listen-before-talk failures and triggering a radio resource control layer reestablishment upon the count reaching a threshold.

In another example aspect, another method of wireless communication is disclosed. The method includes determining, at a physical layer (PHY) of a wireless device, a backoff state based on one or more failures in access a transmission medium, reporting, by the physical layer to a medium access control (MAC) layer, the backoff state and the one or more failures, and controlling retransmission attempts from the MAC layer based on the reporting.

In yet another example aspect, another method of wireless communication is disclosed. The method includes starting, by a wireless device, an access procedure timer that is used to limit a time taken by an access procedure to access a wireless network, and terminating, upon expiration of the access procedure timer, the access procedure.

In yet another example aspect, another method of wireless communication is disclosed. The method includes receiving, by a network device providing wireless connectivity using a listen-before-talk access mechanism, an indication from a wireless device that a number of listen-before-talk attempts has exceeded a threshold, or an access procedure was terminated due to expiration of an access procedure timer, and transmitting a message causing the wireless device to perform a handover due to the indication.

In yet another aspect, one or more of the above-described methods may be implemented by a wireless communications apparatus that includes a processor.

In yet another aspect, the above-described methods may be embodied as processor-executable code and stored on a computer readable medium.

These, and other, features are described in the present document.

DETAILED DESCRIPTION

Section headings are used in the present document only for ease of understanding and do not limit scope of the embodiments described in each section only to that section. Furthermore, while 5G terminology is used for easy understanding, the scope of the disclosed technology is not limited to 5G networks only.

Brief Discussion

In unlicensed spectrum, listen-before-talk (LBT) applying a clear channel assessment (CCA) check needs to be performed before transmitting. The CCA utilizes at least energy detection to determine the presence or absence of other signals on the channel in order to determine if the channel is occupied or clear, respectively.

If the Channel is Occupied:

The node enters a backoff state. In this state, a backoff timer is started and the node waits until the backoff timer expires before performing another LBT check. The backoff timer is decremented whenever there is an unoccupied slot on the medium.

If the Channel is Clear:

The node can transmit. The duration of transmission (also known as channel occupancy time or COT) is limited and is governed by the backoff parameters used to access the channel.

It should be noted that in unlicensed spectrum, each time the node attempts to transmit, it needs to perform LBT as noted above. Hence, if multiple individual transmissions are to be performed, multiple LBT steps are necessary and since each LBT step may result in a failure (i.e. channel busy), the transmission failure probability will increase (i.e. the channel access probability is lower). In order to reduce the LBT impact, in case of some procedures involving multiple transmissions such as the RACH/SR procedure in NR, the number of steps requiring LBT should be reduced as far as possible.

Figure 1:
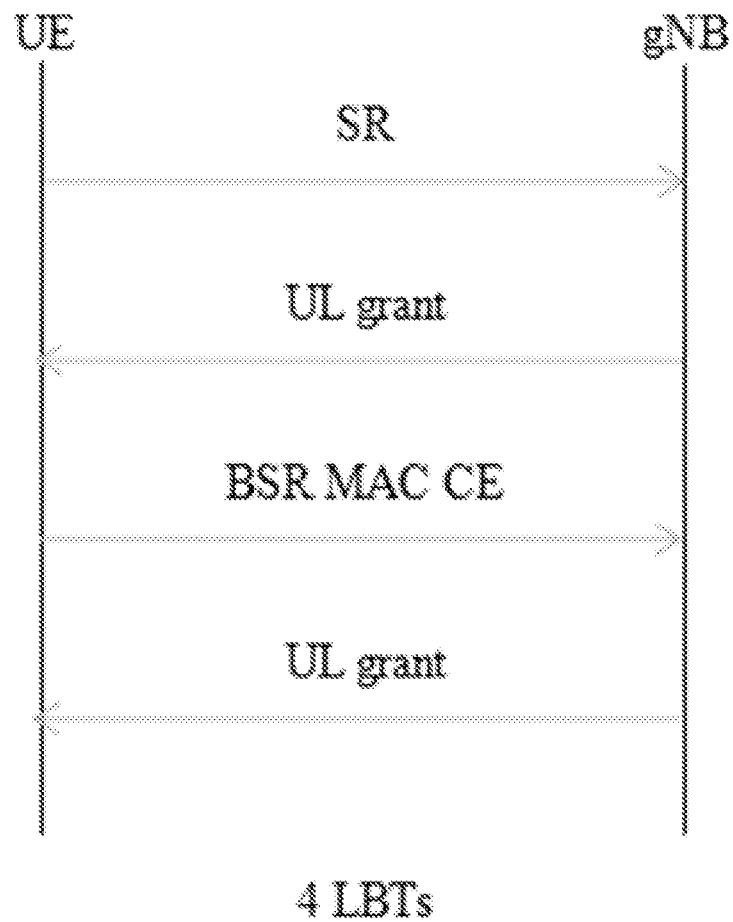
FIG. 1 shows an example of a 4-step LBT process.
Figure 2:
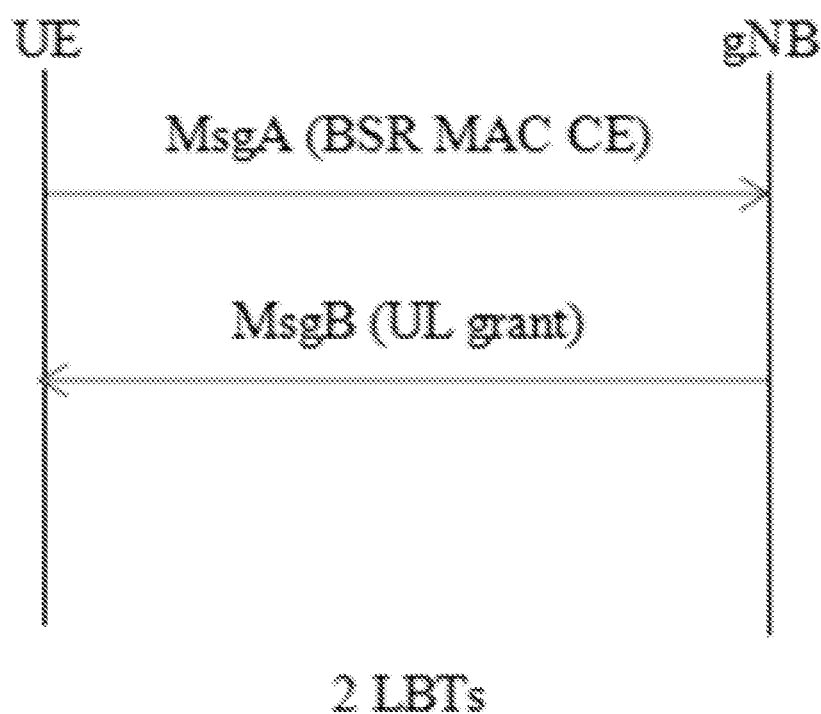
FIG. 2 shows an example of 2-step LBT process.

As an example, in NR, when BSR is triggered and there is no UL grant to transmit BSR, SR is triggered. When SR is transmitted via PUCCH, one LBT is performed. When SR is received in base station, UL grant is transmitted to UE. Then the second LBT is performed as a result at the base station. When UE receives UL grant, BSR MAC CE is transmitted to UE via UL grant. The third LBT is performed. When BSR MAC CE is received by base station, UL grant is transmitted to UE. The fourth LBT is performed. In total, in order to transmit data, the four LBTs are performed as shown in FIG. 1. Therefore, for this procedure, some optimization may be considered.

A first problem solved by some embodiments disclosed herein is regarding a large number of LBT steps resulting in a higher probability of transmission failure over unlicensed spectrum.

In this patent document, some schemes are put forward to reduce the number of performed LBT for SR procedure to solve the above problem.

In addition to the above, in case of NR, the actual LBT procedure using CCA and the backoff mechanisms are executed by the physical layer. As noted above, the physical layer performs the following actions:
  CCA check for channel availability (i.e. to determine whether channel is clear or not)
  Backoff procedure if channel is busy
    This includes drawing a backoff timer which is a random number up to a maximum value (called the contention window value)
    Decrementing the backoff timer for each free slot observed on the channel
  Transmission over the medium if the channel is clear.

On the other hand, the MAC sublayer is responsible for handling the multiplexing and generation of the MAC PDU and submitting this to the physical layer for transmission. As such, the MAC sublayer also maintains certain timers and counters to control the transmission and retransmission of various messages. As an example, in case of RACH procedure, the MAC layer maintains the following timers/counters:
  A prohibit timer for SR: This is used to prohibit transmission of an SR in case this timer is running (this timer is started upon the transmission of an SR over PUCCH).
  Preamble transmission counter: Used to count the number of RACH attempts. When the number exceeds a predetermined threshold (without receiving a response from the network), then a radio link failure procedure is invoked.
  Preamble power ramping: After each unsuccessful transmission of the RACH preamble, the RACH power is incremented
  Ra-Response window: This is a window in time which the UE expects to receive a response for RACH form the network. If the network doesn't respond within this time, the UE is allowed to retransmit the RACH As noted above, all the timers/counters/windows etc are impacted by the LBT functionality. Specifically, if the LBT fails (i.e. channel is sensed to be busy), the UE will not transmit the message initiated by MAC but it will instead enter a backoff procedure. As noted above, if the physical layer is executing the backoff procedure, further transmissions are not possible. Although it was mentioned that the physical layer may indicate to the MAC layer the success/failure of LBT, this information itself is not sufficient for the MAC layer since the subsequent action taken by the MAC layer depends on when the channel is available again (i.e. when the physical layer comes out of the backoff state). So, a new mechanism for MAC/Phy interaction is necessary to take into account the backoff state.

A second problem solved by some embodiments disclosed herein is that the MAC layer is unaware of the duration of the time for which the physical layer is in the backoff state. As a result new MAC procedures may be invoked whilst the physical layer is in backoff state resulting in increased number of LBT failures.

This document provides a new mechanism for MAC/Phy interaction to solve this problem.

EMBODIMENT EXAMPLES

This embodiment solves at least Problem 1.

In RAN #82, work item that 2-step RACH procedure will be studied is agreed. It means 2-step RACH will be standardized in R16. For 2-step RACH procedure, preamble and payload as MsgA is transmitted to base station, Msg2 and Msg4 in 4-step RACH as MsgB is transmitted to UE. Since payload may be transmitted in the first message, BSR MAC CE indicating UE date volume may be included in payload. When BSR MAC CE is received by base station, UL grant may be transmitted to UE. For getting UL grant via RACH procedure, 2 LBTs are performed, which decreases the probability of LBT failure.

If UL grant is obtained via SR procedure, 4 LBTs need to be performed. Therefore, in order to decrease the number of performed LBT, when the condition triggering SR is met, 2-step RACH may be triggered. In other words, UE may initiate 2-step RACH procedure instead of SR procedure, then LBT impact may be decreased.

In base station, the mode indicating that either SR procedure or 2-step RACH procedure is performed may be configured to UE. For example, model means UE performs SR procedure, and mode 2 means 2-step RACH procedure.

In UE, normal 2-step RACH procedure may be used. In addition, some specific operation may also be used, such that network may know that 2-step RACH procedure is used for replacing SR procedure. Some schemes are as follows.
  Scheme1: specific preamble is allocated to UE to be used for 2-step RACH procedure instead of SR procedure.
  Scheme2: one new MAC CE is introduced to inform the network 2-step RACH procedure instead of SR procedure.

When transmission fails due to LBT, LBT failure number may be counted. When LBT failure number exceeds a threshold, LBT failure problem may be indicated to the upper layer (RRC layer). When the upper layer receives LBT failure problem, RLF may be triggered. Then RRC reestablishment procedure is initialized. LBT failure may be informed to base station, such that base station may indicate UE to handover to other frequency.

As we know, when LBT fails, physical layer will perform a backoff procedure. Within the backoff timer, transmission will not be performed. More information may be indicated to MAC layer in addition to LBT success/failure. Some possible parameters are listed as follows.
  Randomly selected Backoff timer value
  Available transmission occasion
  Backoff timer state (expiration or running)
  Evaluated backoff timer value When one of parameters listed above is received, MAC perform transmission according to the indication from the physical layer. If backoff timer value is received, MAC may wait for the backoff timer expiration to attempt the next transmission. When available transmission occasion is received, other occasions before the indicated transmission occasion will not be used.

Embodiment 1 (Base Station Configuration)

When the condition triggering SR procedure is met in NR/LTE, the UE behavior performing either SR procedure or 2-step RACH procedure needs to be indicated, such that UE may know perform which procedure. The indication may be informed to UE via RRC message, for example RRC setup message, RRC reestablishment message or RRC reconfiguration message. In the following, an example regarding on indication is given out.

Figure 3:
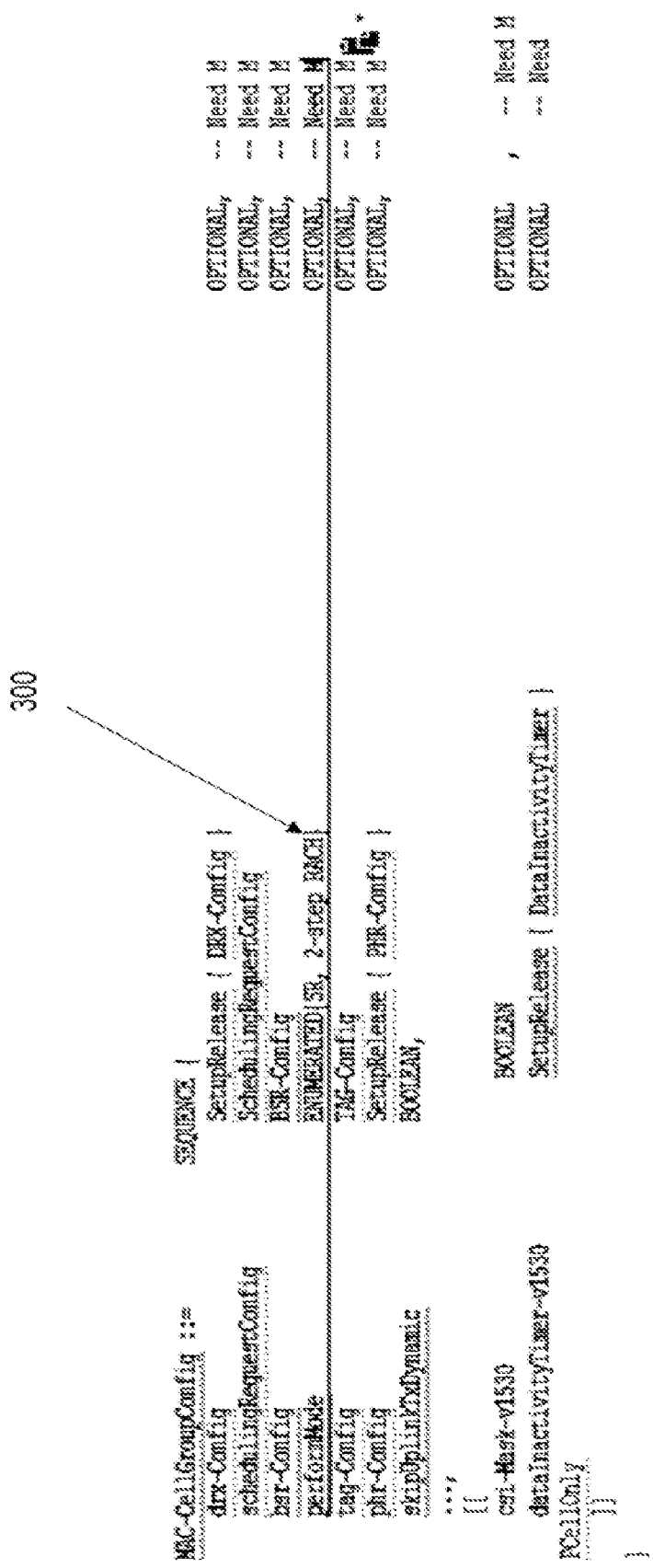
FIG. 3 shows an example of message syntax.

FIG. 3 depicts an example of a message that carries a field 300, called performMode field which includes at least two possible values, one indicating the use of SR procedure and the other indicating use of the 2-step RACH procedure.

Accordingly, if performMode is configured SR, SR procedure is performed, otherwise 2-step RACH procedure is performed. If this parameter is not configured, default is that SR procedure is performed.

Embodiment 2 (UE Behavior Mode Distinguish)

In NR, when the condition below is met, SR procedure is triggered.
 2>if a Regular BSR has been triggered and logicalChannelSR-DelayTimer is not running:
  3>if there is no UL-SCH resource available for a new transmission; or
  3>if the MAC entity is configured with configured uplink grant(s) and the Regular BSR was triggered for a logical channel for which logicalChannelSR-Mask is set to false; or
  3>if the UL-SCH resources available for a new transmission do not meet the LCP mapping restrictions configured for the logical channel that triggered the BSR:
   4>trigger a Scheduling Request.

When performMode is introduced, according to whether performMode is configured or not, the modification is as follows.
 2>if a Regular BSR has been triggered and logicalChannelSR-DelayTimer is not running:
  3>if there is no UL-SCH resource available for a new transmission; or
  3>if the MAC entity is configured with configured uplink grant(s) and the Regular BSR was triggered for a logical channel for which logicalChannelSR-Mask is set to false; or
  3>if the UL-SCH resources available for a new transmission do not meet the LCP mapping restrictions configured for the logical channel that triggered the BSR:
   4>if performMode is configured and performMode is configured 2-step RACH
    5>trigger 2-step random access.
   4>else
    5>trigger a Scheduling Request.

Once 2-step RACH procedure is triggered, all pending SR(s) shall be canceled and each respective sr-ProhibitTimer shall be stopped.

Embodiment 3 (UE Behavior Trigger Directly 2-Step RACH is Supported)

In NR, when the condition below is met, SR procedure is triggered.
 2>if a Regular BSR has been triggered and logicalChannelSR-DelayTimer is not running:
  3>if there is no UL-SCH resource available for a new transmission; or
  3>if the MAC entity is configured with configured uplink grant(s) and the Regular BSR was triggered for a logical channel for which logicalChannelSR-Mask is set to false; or
  3>if the UL-SCH resources available for a new transmission do not meet the LCP mapping restrictions configured for the logical channel that triggered the BSR:
   4>trigger a Scheduling Request.

In order to decrease LBT number for getting UL grant, 2-step RACH procedure may be triggered. For specification, the modification is as follows. Of course, 2-step RACH procedure needs to be supported in UE capability.
 2>if a Regular BSR has been triggered and logicalChannelSR-DelayTimer is not running:
  3>if there is no UL-SCH resource available for a new transmission; or
  3>if the MAC entity is configured with configured uplink grant(s) and the Regular BSR was triggered for a logical channel for which logicalChannelSR-Mask is set to false; or
  3>if the UL-SCH resources available for a new transmission do not meet the LCP mapping restrictions configured for the logical channel that triggered the BSR:
   4>if 2-step RACH is supported
    5>trigger 2-step random access.
   4>else
    5>trigger a Scheduling Request.

When 2-step RACH procedure is triggered, all pending SR(s) shall be canceled and each respective sr-ProhibitTimer shall be stopped.

Embodiment 4 (when 2-Step is Triggered, RACH Trigger Event Add, in 3GPP Document 38.300)

When the condition that trigger SR procedure is met and 2-step random access is triggered, a new random access triggered event needs to be added. In current NR specification, the random access procedure is triggered by a number of events as follows. If a new triggered event is added, the modification is as follows.

Initial access from RRC IDLE;
RRC Connection Re-establishment procedure;
Handover;
DL or UL data arrival during RRC CONNECTED when UL synchronisation status is "non-synchronised";
UL data arrival during RRC CONNECTED when there are no PUCCH resources for SR available;
SR failure;
Request by RRC upon synchronous reconfiguration;
Transition from RRC INACTIVE;
To establish time alignment at SCell addition;
Request for Other SI (see subclause 7.3);
Beam failure recovery.
BSR failure.

For BSR failure, the RACH procedure is initialed by MAC entity itself. Therefore, for 38.321 specification, the initialed procedure needs not to be added.

Embodiment 5 (Normal Preamble)

When the condition that triggered SR procedure is met and 2-step RACH procedure is initialed, the normal 2-step RACH procedure is performed. It means that for this triggered event, network cannot distinguish. But for this case, once BSR MAC CE is received, required resource should be allocated to UE. When UL grant is received, UE may perform transmission.

Embodiment 6 (Specific Preamble)

When the condition that triggered SR procedure is met and 2-step RACH procedure is initialed, 2-step random access procedure may be performed. For this case, some specific preambles may be reserved to use. In other words, for this case, UE selects preamble within the reserved preambles. Both C-RNTI MAC CE and BSR MAC CE may be as payload, then the selected preamble and payload as MsgA is transmitted to base station.

When MsgA is received, base station may distinguish the triggered event by received preamble. For this case, resource needed according to BSR MAC CE may be allocated to UE.

When allocated resource is received, UE may perform transmission according to the allocated resource and data volume.

Embodiment 7 (New MAC CE is Introduced, and BSR MAC CE)

When the condition that triggered SR procedure is met and 2-step RACH procedure is initialed, 2-step random access procedure may be performed. For this case, in order to inform base station the triggered event, a new MAC CE may be introduced. For this specific MAC CE, it may be named as RACH indication MAC CE. This MAC CE is identified by a MAC PDU subheader with LCID as specified in Table 1 below. Value 33 may be as LCID for this MAC CE.

TABLE 1

| Values of LCID for UL-SCH | |
|---|---|
| Index | LCID values |
| 0 | CCCH of size 64 bits |
| 1-32 | Identity of the logical channel |
| 33 | BSR failure |
| 34-51 | Reserved |
| 52 | CCCH of size 48 bits |
| 53 | Recommended bit rate query |
| 54 | Multiple Entry PHR (four octet $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

For this case, C-RNTI MAC CE, BSR MAC CE and RACH indication MAC CE may be as payload. Then the selected preamble and payload may as MsgA is transmitted to base station. When MsgA is received, according to RACH indication MAC CE, the triggered event may be known by base station. An suitable resource may be allocated to UE based on BSR MAC CE.

Embodiment 8 (UE Capability Support Replacement)

When the condition that triggered SR procedure is met, either SR procedure or 2-step RACH procedure is performed based on UE capability. For example, in UE capability, SROr2-stepRACH as a parameter may be introduced as follows.

TABLE 2

UE-NR-Capability ::= SEQUENCE {
   SROr2-stepRACH   ENUMERATED {supported}
OPTIONAL,
}

If SROr2-stepRACH is configured supported, once the condition that triggered SR procedure is met, 2-step RACH procedure will be initialed. If this parameter is not configured, SR procedure will be performed.

Embodiments 9 (2-Step RACH Transmit all Data, BSR is Canceled Specification Modified)

When the condition that triggered SR procedure is met and 2-step RACH procedure is triggered, 2-step random access procedure will be performed. If pre-configured resource bear payload can accommodate all pending data available, all triggered BSRs may be canceled. Therefore, for this case, specification modification are as follows.

All triggered BSRs may be cancelled when the UL grant(s) or pre-configured resource can accommodate all pending data available for transmission but is not sufficient to additionally accommodate the BSR MAC CE plus its subheader. All BSRs triggered prior to MAC PDU assembly shall be cancelled when a MAC PDU is transmitted and this PDU includes a Long or Short BSR MAC CE which contains buffer status up to (and including) the last event that triggered a BSR prior to the MAC PDU assembly.

Embodiments 10 (LBT Failure is Indicated to RRC Reestablishment Cause Include LBT Failure)

Transmission may fail due to LBT failure in physical layer. When LBT failure number reaches a threshold, LBT failure problem may be indicated to upper layer (RRC). When LBT failure problem is indicated to the upper layer, RLF is triggered, then RRC reestablishment is performed. For this case, LBT failure as a reestablishment cause may be informed to base station. An example that LBT failure is added as a reestablishment cause is as follows.

TABLE 3

RestablishmentCause : := ENUMERATED {reconfigurationFailure,
                                       handoverFailure,
LBTFailure, otherFailure, sparel}

When RRC reestablishment procedure is completed and ReestablishmentCause is LBTFailure, base station may indicate UE handover to other frequency.

Embodiment 11 (Backoff Value is Indicated to MAC, MAC Process)

This embodiment solves problem 2 mentioned in the background section.

For each transmission, when LBT fails, a backoff timer will be started. Taking RACH procedure as an example, when preamble transmission fails due to LBT, physical layer will start a backoff timer and MAC will attempt a retransmission of preamble in the next available RACH occasion. However, if there is a backoff timer running in the physical layer, then there may be no opportunity to attempt a retransmission. In order to avoid the MAC attempting further transmissions during backoff time, the physical layer may, in addition to indicating LBT failure, may also indicate certain parameters related to the backoff state.

In order to achieve the above, the physical layer may indicate one or more of the following to the MAC layer (The actions performed by the MAC layer as a result of receiving each of these indications are also mentioned below):

The phy is in a backoff state (i.e. backoff timer running)
  MAC layer may refrain from transmitting any further PDUs or messages when the phy is in this state.
The phy has left the backoff state (i.e. backoff timer has expired)
  MAC layer may initiate any pending transmissions or retransmissions as a result of receiving such an indication
    This may include MAC layer triggering any pending RACH/SR transmissions
    Initiating (re)transmission of a pending MAC PDU etc
The backoff timer is about to expire
  Such an indication may be triggered upon the backoff timer reaching/falling below a certain threshold
  MAC layer may start assembling a MAC PDU and/or start looking for the next available transmission opportunity (e.g. RACH opportunity in time etc) so that the next transmission is triggered.
The value of the backoff timer (i.e. the value of the random number which corresponds to the backoff timer value, as determined by the physical layer when entering the backoff state)
  Based on the received backoff timer value, the MAC layer may determine when the next available retransmission of the failed transmission can be scheduled. Note that there is a likelihood that a retransmission triggered after such time may also fail since the actual expiration of the backoff timer at physical layer is subject to availability of free slots over the medium (and such an information is not available to the MAC layer).
The value of the current backoff timer (i.e. if a transmission is attempted in the middle of the backoff state, then the phy can indicate to the MAC layer how much backoff timer value is still pending)
  Similar to the above, this may be used by MAC layer to determine the next possible time instance when a transmission/retransmission can be scheduled.
An estimated time at which the backoff timer is likely to expire
  It should be noted that the backoff timer is only decremented upon sensing a free slot on the channel. The availability of such free slots on the channel depends on the transmissions from other nodes. Hence, a specific time at which the backoff timer will expire cannot be obtained deterministically by the phy. Instead, the phy can estimate the time at which the backoff timer is likely to expire. Such an estimation may be made by the phy based on several inputs such as the general channel occupancy load, based on any information available about the transmissions that are happening or likely to happen over the medium in future (this may include for instance information obtained from the transmissions observed over the medium—as an example, when a Wi-Fi transmission is detected, the Wi-Fi MAC header contains the total transmission duration of this transmission, and this may be used in determining when the backoff timer is likely to expire). In any case, it should be noted that the indication of when the backoff timer is likely to expire is only an expected indication and not a deterministic one from phy to MAC. Hence, a further indication indicating when the backoff timer has actually expired, is useful in addition.
An timeslot at which next transmission is feasible
  As an example for RACH, the physical layer can indicate to the MAC layer when the next possible RACH occasion which falls after the backoff period has finished occurs. The MAC layer may then attempt the retransmission of the RACH at or subsequent to such time as indicated by the physical layer.

In general, upon receiving any of the above indications from Phy, the MAC may:
  Not start the SR prohibit timer
  Not increment SR counter
  Not increment the preamble transmission counter
  Not increase the preamble transmission power at the next transmission occasion
  Not start the Ra-Response window timer
  Not start the timer used for configured grant transmission As further specific example in case of RACH procedure, when the physical layer indicates that backoff state is applicable, the MAC layer will not start RAR window. Further, the MAC layer may also not increment the power ramping counter or the RACH transmission counter. When the Physical layer subsequently indicates that the phy is ready for transmission (e.g. after the backoff timer has expired), MAC will attempt the next preamble transmission.

In another scheme, the MAC may maintain the backoff timer whilst the physical channel simply indicates whether the physical channel is free or not (there by enabling MAC to countdown the backoff timer). The advantage of this scheme is that the MAC is then fully aware of the backoff state. On the other hand, this requires the physical layer to indicate, for each timeslot, whether the medium is free or busy. Since both MAC and phy are implemented in the same UE, such an implementation is feasible.

Embodiment 12 (Timer for RACH Procedure)

When preamble transmission fails due to LBT, if preamble transmission counter is not incremented, RACH procedure may not be terminated for a long time. Considering the issue, a timer may be introduced. The timer may be configured by the system information or RRC message.

When one of the below conditions is met, the timer will be started.
  When the RACH procedure is triggered
  when the first preamble is indicated to the physical layer
  when the first LBT failure indication is received by the physical layer When one of the below conditions is met, the timer will be terminated:
  preamble is successfully transmitted. RAR window will be started, and wait for MAC RAR within RAR window.
  RACH procedure is successfully completed.
  preamble transmission counter reaches the maximum preamble transmission number.
When the timer expires, one of the below procedures will be performed:
  the RACH procedure will be terminated, the running timer should be terminated. Random access problem or an indication is informed to the RRC layer.
  it is considered one preamble attempt. The next RACH occasion may be indicated to the physical layer.
When the indication is received by the RRC layer, RLF may be triggered. UE may select other frequency to perform the random access procedure.

Embodiment 13 (Timer for SR)

SR may not be transmitted due to some reasons, for example SR for eMBB may be collide with SR for URLLC, LBT failure. If for these cases, SR counter is not incremented, SR may not be terminated for a long time. Therefore, in order to terminate the procedure, a timer may be introduced. In addition, if SR counter is incremented, an indication needs to be informed to the MAC layer. The timer may be configured by the system information or RRC message.

When SR is triggered, and MAC instruct the physical layer to signal SR on the valid PUCCH resource for SR, the timer may be started.

When the timer expires, one of the below procedures will be performed:
  it is considered one SR attempt and the prohibit timer may be started. When the prohibit timer expires, SR may be instructed to the physical layer. Meanwhile, the timer should also be started.
  RACH procedure may be triggered.
  SR failure may be indicated to RRC layer, and RLF will be triggered.

When one of the below conditions is met, the timer may be terminated:
  When SR is successfully transmitted, the timer may be terminated. In addition, the prohibit timer is started in order to prohibit the next SR transmission. Meanwhile, the timer will also be started.
  When UL grant is received, the timer may be terminated. All pending SR(s) triggered prior to the MAC PDU assembly shall be cancelled and each respective sr-ProhibitTimer shall be stopped when the MAC PDU is transmitted and this PDU includes a Long or Short BSR MAC CE which contains buffer status up to (and including) the last event that triggered a BSR prior to the MAC PDU assembly. All pending SR(s) shall be cancelled and each respective sr-ProhibitTimer shall be stopped when the UL grant(s) can accommodate all pending data available for transmission.
  SR counter reaches the maximum transmission number of SR.

Figure 4A:
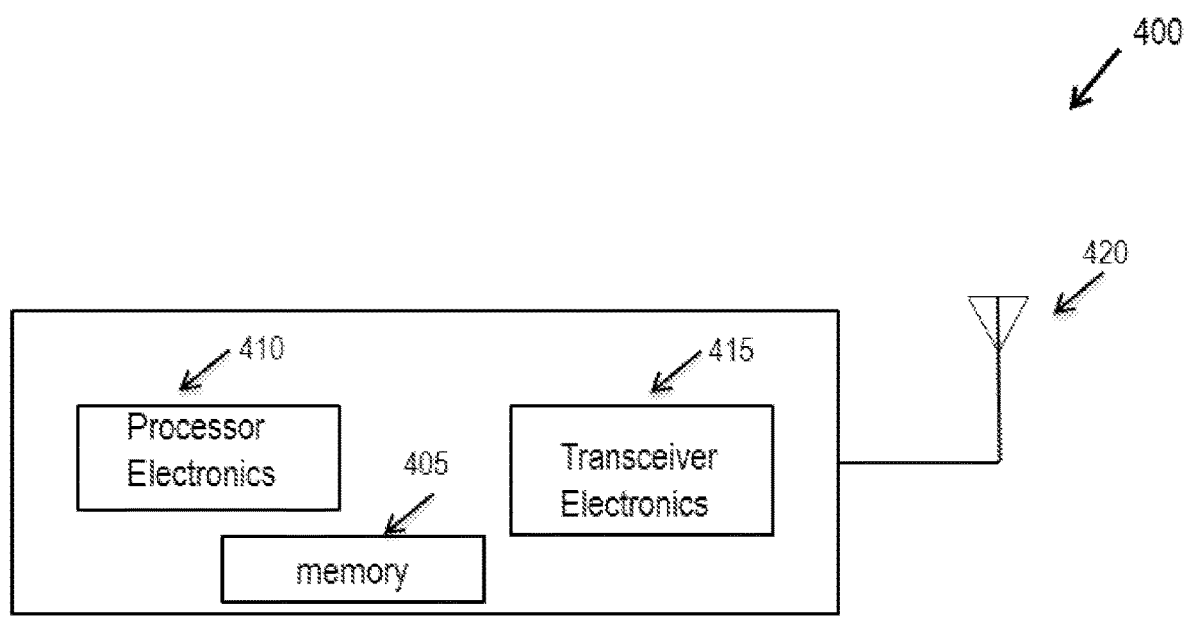
FIG. 4A is a block diagram showing an example embodiment of a wireless communication device.

FIG. 4A is a block diagram representation of a portion of a radio station. A radio station 405 such as the network-side device or a wireless terminal or a UE can include processor electronics 410 such as a microprocessor that implements one or more of the wireless techniques presented in this document. The radio station 405 can include transceiver electronics 415 to send and/or receive wireless signals over one or more communication interfaces such as antenna 420. The radio station 405 can include other communication interfaces for transmitting and receiving data. Radio station 405 can include one or more memories (not explicitly shown) configured to store information such as data and/or instructions. In some implementations, the processor electronics 410 can include at least a portion of the transceiver electronics 415. In some embodiments, at least some of the disclosed techniques, modules or functions are implemented using the radio station 405. The radio station 405 may for example be used as a hardware platform to implement a method described in the present document.

Figure 4B:
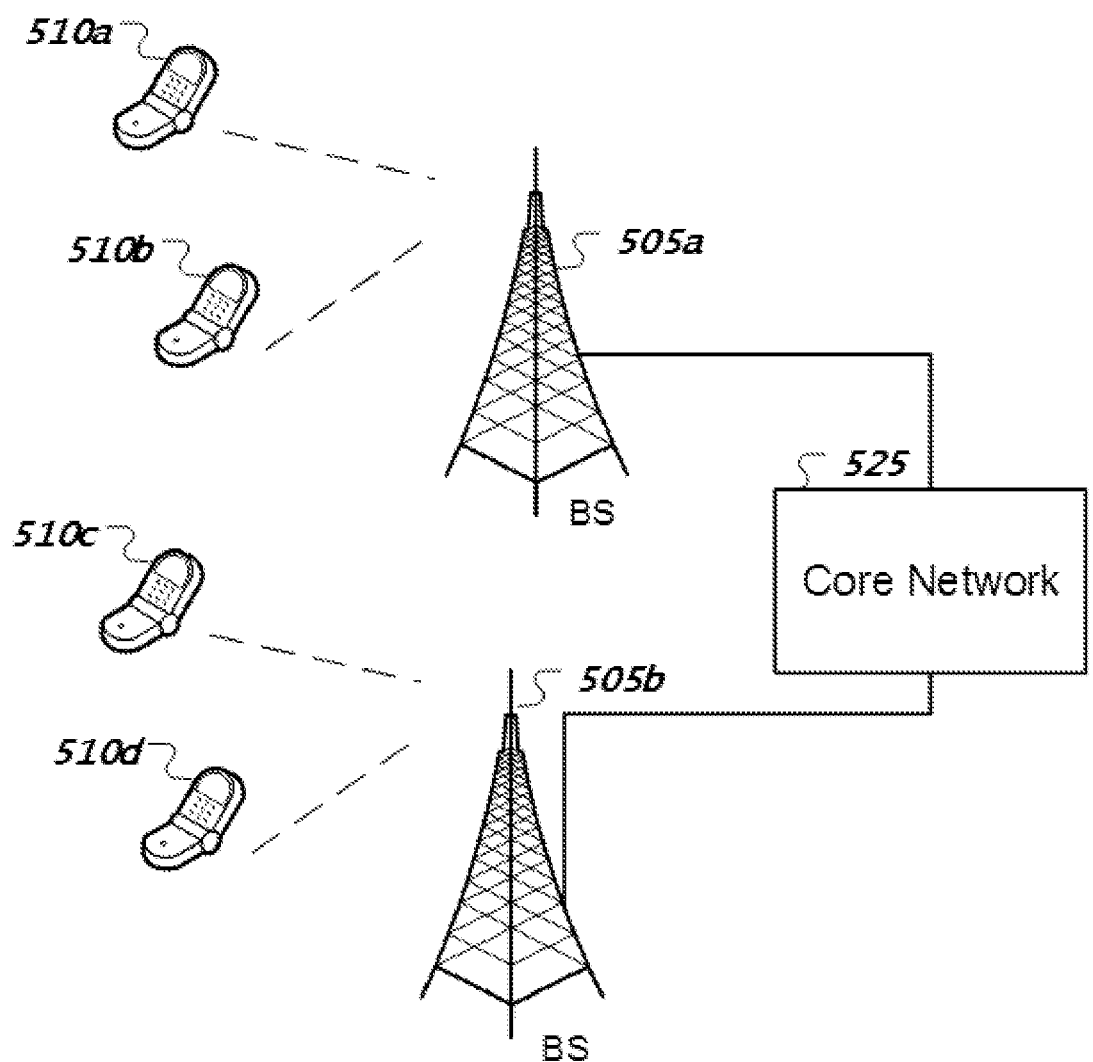
FIG. 4B shows an example of a wireless network.

FIG. 4B shows an example of a wireless communication system 500 where techniques in accordance with one or more embodiments of the present technology can be applied. A wireless communication system 500 can include one or more base stations (BSs) 505a, 505b, one or more wireless devices 510a, 510b, 510c, 510d, and a core network 525. A base station 505a, 505b can provide wireless service to wireless devices 510a, 510b, 510c and 510d in one or more wireless sectors. In some implementations, a base station 505a, 505b includes directional antennas to produce two or more directional beams to provide wireless coverage in different sectors.

The core network 525 can communicate with one or more base stations 505a, 505b. The core network 525 provides connectivity with other wireless communication systems and wired communication systems. The core network may include one or more service subscription databases to store information related to the subscribed wireless devices 510a, 510b, 510c, and 510d. A first base station 505a can provide wireless service based on a first radio access technology, whereas a second base station 505b can provide wireless service based on a second radio access technology. The base stations 505a and 505b may be co-located or may be separately installed in the field according to the deployment scenario. The wireless devices 510a, 510b, 510c, and 510d can support multiple different radio access technologies. The various methods described in the present document may be implemented at the base station 505a, 505b or the wireless devices 510a, 510b, 510c, and 510d. For example, the hardware platform depicted in FIG. 4A for the radio station may be used for the implementation.

Figure 5:
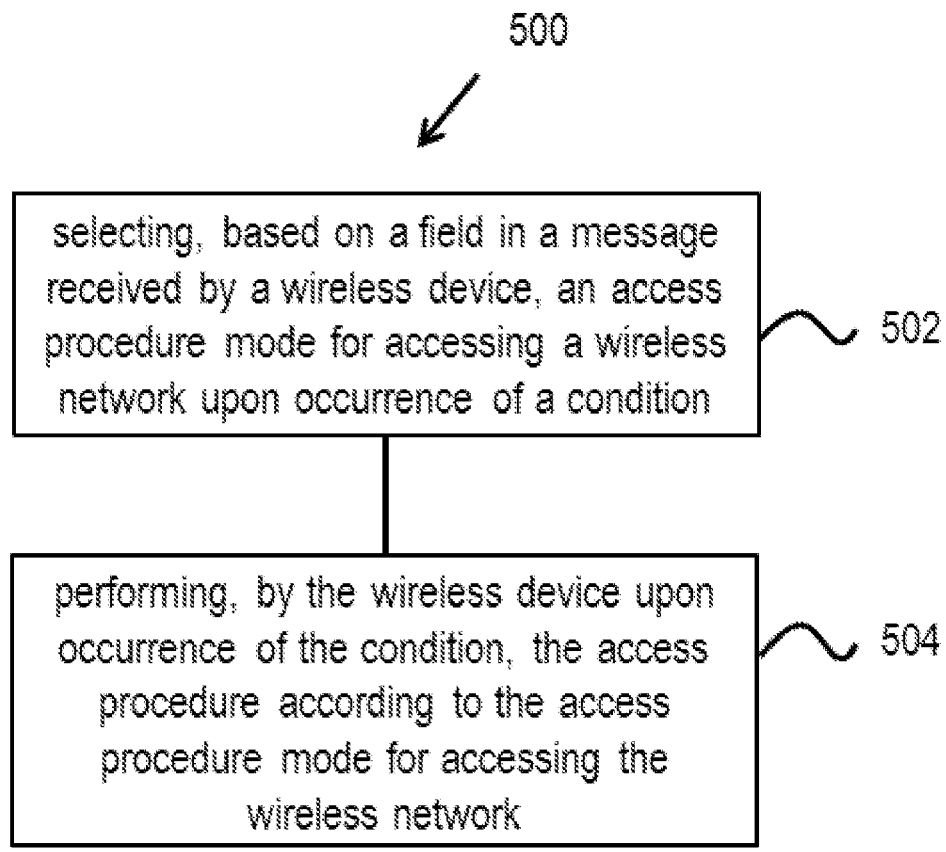
FIG. 5 shows a flowchart for an example method of wireless communication.

FIG. 5 is a flowchart for a method 500 of wireless communication. The method 500 includes selecting (502), based on a field in a message received by a wireless device, an access procedure mode for accessing a wireless network upon occurrence of a condition, and performing (504), by the wireless device upon occurrence of the condition, the access procedure according to the access procedure mode for accessing the wireless network.

In some embodiments, the access procedure mode is a scheduling request access mode or a 2-step random access mode.

In some embodiments, the message is a radio resource control (RRC) message.

In some embodiments, the message is included in an RRC setup message.

In some embodiments, the message is included in an RRC reestablishment message.

In some embodiments, the message is included in an RRC configuration message.

In some embodiments, the condition is that a buffer status report is triggered and a scheduling request delay timer is not running and scheduling bandwidth is unavailable or a medium access control entity is configured with transmission grants and a regular buffer status report is triggered for a logical channel for which a corresponding mask is set to false or the scheduling resources available to new transmission do not meet channel prioritization mapping restrictions. Embodiment 2 provides an example of such embodiments.

In some embodiments, the method 500 further includes: canceling, after the access procedure is performed, pending scheduling requests and stopping a timer for each pending scheduling request. Embodiments 2, 3 and 9 provide additional features and examples.

In some embodiments, the condition comprises a failure in reporting a buffer status report. For example, Embodiment 4 describes one such situation.

In some embodiments, the performing the access procedure includes transmitting a message using a preamble from reserved preambles, and wherein the message includes a first control element uniquely identifying the user device, and a second control element indicative of a buffer status report. Embodiment 6 provides additional features of such embodiments.

In some embodiments, the performing the access procedure includes transmitting an access message carrying a medium access control element (MAC CE) that includes a logical channel identifier, wherein the access message indicates to a network node that the wireless device is performing the access procedure.

In some embodiments, the performing the access procedure includes transmitting an access message carrying a cell radio network temporary identifier (C-RNTI) medium access control element (MAC CE).

In some embodiments, the performing the access procedure includes transmitting an access message carrying a buffer status report (BSR) medium access control element (MAC CE). Embodiment 7 provides additional examples.

In some embodiments, the performing the access procedure mode is further selected using a capability of the wireless device. Embodiment 8 provides additional details and examples for capability based operation.

Various embodiments related to Problem 1 discussed in the present document (e.g., embodiments 1 to 10) provide further embodiments and features of method 500.

Figure 6:
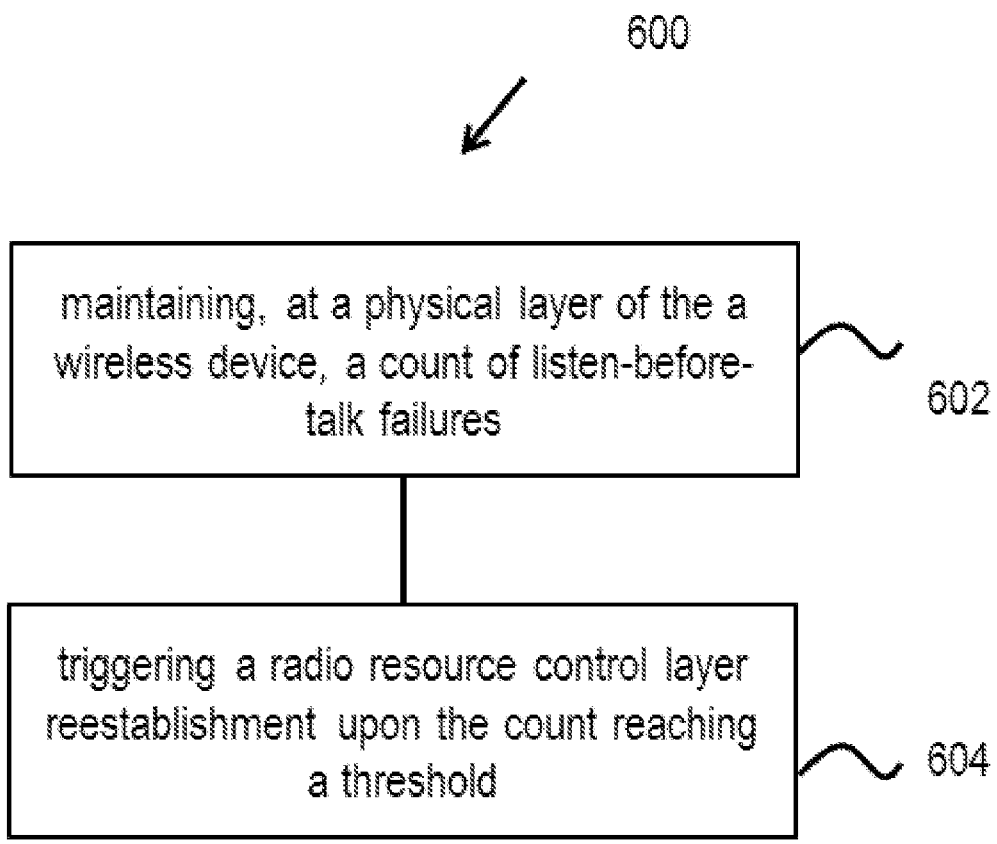
FIG. 6 shows a flowchart for an example method of wireless communication.

FIG. 6 is a flowchart for a method 600 of wireless communication. The method 600 includes maintaining (602), at a physical layer of a wireless device, a count of listen-before-talk failures and triggering (604) a radio resource control layer reestablishment upon the count reaching a threshold.

In some embodiments, the triggering is performed by a medium access control (MAC) layer of the wireless device.

In some embodiments, the triggering includes indicating the listen-before-talk failures to a network device.

In some embodiments, the method 600 further includes receiving, from the network device, a new frequency for a handover due to the listen-before-talk failures. Embodiments 11-13 provide additional details of method 600.

Figure 7:
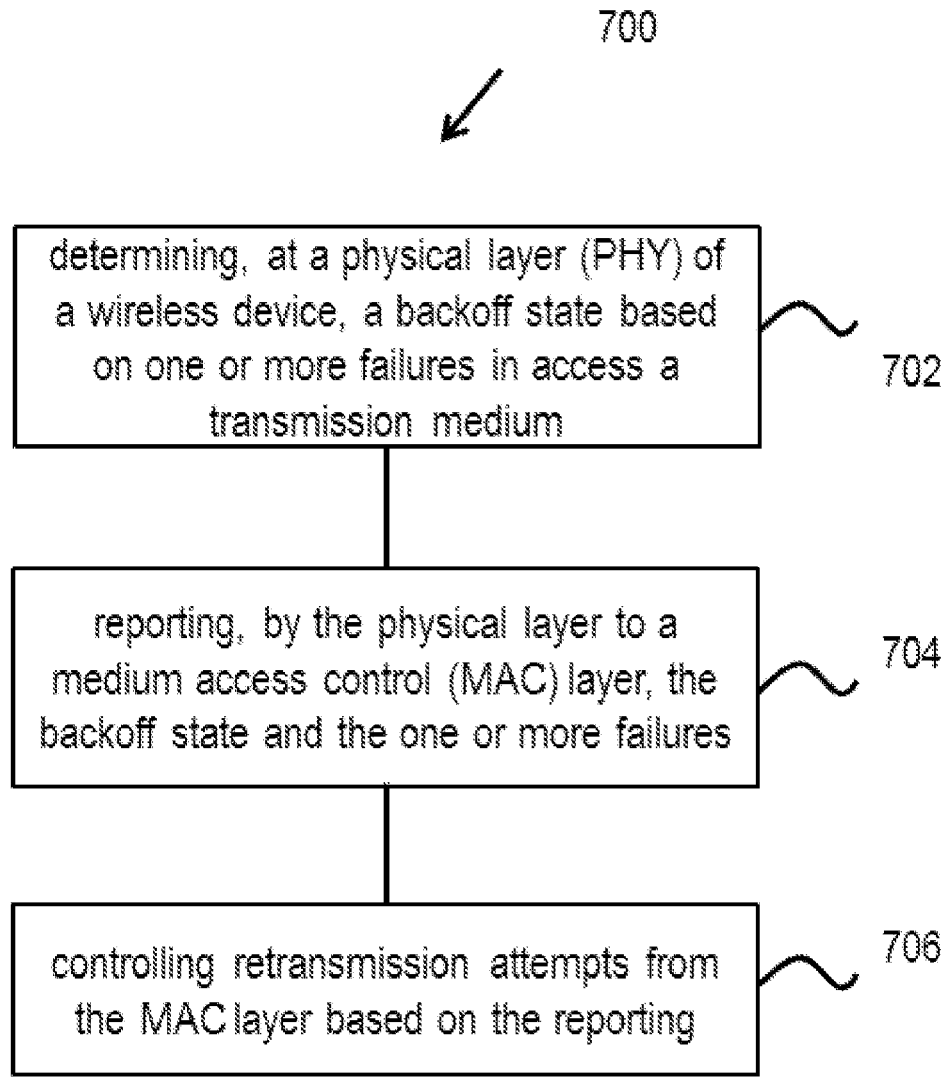
FIG. 7 shows a flowchart for an example method of wireless communication.

FIG. 7 is a flowchart for a method 700 of wireless communication. The method 700 includes determining (702), at a physical layer (PHY) of a wireless device, a backoff state based on one or more failures in access a transmission medium, reporting (704), by the physical layer to a medium access control (MAC) layer, the backoff state and the one or more failures, and controlling (706) retransmission attempts from the MAC layer based on the reporting.

In some embodiments, the backoff state indicates that a backoff timer is running at the PHY, and wherein the MAC layer refrains from attempting to transmit while the PHY is in the backoff state.

In some embodiments, the backoff state indicates that a backoff timer has expired, and wherein the MAC layer attempts transmitting or retransmitting pending data transmissions.

In some embodiments, the backoff state indicates that a backoff timer is about to expire, and wherein the MAC layer begins assembling a MAC layer protocol data unit for transmission upon receiving the backoff state.

In some embodiments, the backoff state indicates a value of a backoff timer used for backing off by the PHY, or a current value of the backoff timer, and wherein the MAC layer, based on the backoff state, schedules a retransmission of a failed transmission.

In some embodiments, the backoff state indicates an estimate of a time at which a backoff timer is likely to expire.

In some embodiments, the backoff state identifies a time slot at which a next transmission is possible.

In some embodiments, the MAC layer refrains from performing the following as a result of receiving the backoff state: starting a scheduling request prohibit timer, incrementing a scheduling request counter, incrementing a preamble transmission counter, increasing preamble transmission power for a next transmission, starting a random access response window timer, starting a timer used for configured grant transmission, or a random access window.

In some embodiments, the PHY refrains from maintaining a backoff timer and wherein the MAC layer maintains a backoff timer. Embodiments 11-13 provide additional details of method 700.

Figure 8:
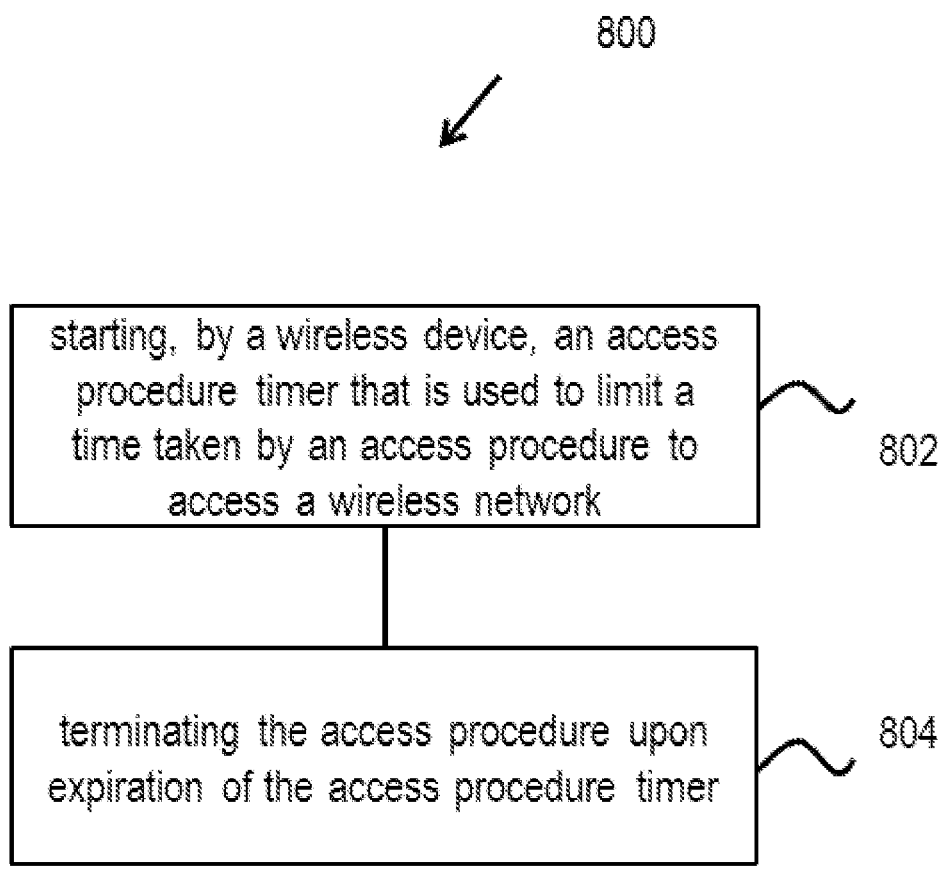
FIG. 8 shows a flowchart for an example method of wireless communication.

FIG. 8 is a flowchart for a method 800 of wireless communication. The method 800 includes starting (802), by a wireless device, an access procedure timer that is used to limit a time taken by an access procedure to access a wireless network, and terminating (804), upon expiration of the access procedure timer, the access procedure.

In some embodiments, the access procedure timer is started when the access procedure is triggered or when a first preamble is indicated at a physical layer or the wireless device or when a transmission failure is received at the physical layer.

In some embodiments, the access procedure timer is terminated when a preamble is successfully transmitted or when the access procedure is successfully completed or when a preamble transmission counter reaches a maximum threshold.

In some embodiments, the access procedure timer is started upon triggering a transmission of a scheduling request.

In some embodiments, the access procedure timer is terminated upon successful completion of the access procedure or upon receiving a transmission grant or upon a scheduling request counter reaching a maximum count.

In some embodiments, upon expiration of the access procedure timer, a timer to prohibit a scheduling request transmission is started or a random access procedure is started or a radio link failure recovery procedure is triggered. Embodiments 11-13 provide additional details of method 800.

In some embodiments, a network device such as an access point or a base station may implement a method that includes, receiving, by a network device providing wireless connectivity using a listen-before-talk access mechanism, an indication from a wireless device that a number of listenbefore-talk attempts has exceeded a threshold or an access procedure was terminated due to expiration of an access procedure timer, and transmitting a message causing the wireless device to perform a handover due to the indication. Other aspects of this method are described with respect to methods 500, 600, 700 and 800.

It will be appreciated that the present document discloses techniques that can be used by wireless networks to reduce the number of listen-before-talk attempts during wireless communication between wireless devices and wireless networks. The present document discloses techniques that can be used by wireless device embodiments (e.g., UEs, including for example smartphones and other wireless communication capable devices) and network-side equipment such as access points and base stations, to signal the use of a low LBT scheme and corresponding use of low LBT scheme.

In another advantageous aspect, the patent document describes a MAC/PHY architecture that improves the communication signaling between MAC and PHY layers of a wireless device to avoid inefficiency due to uncertainty associated with the state of availability of transmission medium during listen-before-talk operation.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of wireless communication, comprising:
   selecting, based on a field in a message received by a wireless device, an access procedure mode for accessing a wireless network upon occurrence of a condition, wherein the condition includes a buffer status report being triggered and a scheduling request delay timer being not running; and performing, by the wireless device upon occurrence of the condition, the access procedure according to the access procedure mode for accessing the wireless network.

2. The method of claim 1, wherein the access procedure mode is a scheduling request access mode or a 2-step random access mode.

3. The method of claim 1, wherein the message is a radio resource control (RRC) message.

4. The method of claim 3, wherein the message is included in an RRC setup message.

5. The method of claim 3, wherein the message is included in an RRC reestablishment message.

6. The method of claim 3, wherein the message is included in an RRC configuration message.

7. The method of claim 1, wherein the condition is that scheduling bandwidth is unavailable or a medium access control entity is configured with transmission grants and a regular buffer status report is triggered for a logical channel for which a corresponding mask is set to false or the scheduling resources available to new transmission do not meet channel prioritization mapping restrictions.

8. The method of claim 7, further including:
canceling, after the access procedure is performed, pending scheduling requests and
stopping a timer for each pending scheduling request.

9. The method of claim 1, wherein the condition comprises a failure in reporting a buffer status report.

10. The method of claim 1, wherein the performing the access procedure includes transmitting a message using a preamble from reserved preambles, and wherein the message includes a first control element uniquely identifying the user device, and a second control element indicative of a buffer status report.

11. The method of claim 1, wherein the performing the access procedure includes transmitting an access message carrying a medium access control element (MAC CE) that includes a logical channel identifier, wherein the access message indicates to a network node that the wireless device is performing the access procedure.

12. The method of claim 1, wherein the performing the access procedure includes transmitting an access message carrying a cell radio network temporary identifier (C-RNTI) medium access control element (MAC CE).

13. The method of claim 1, wherein the performing the access procedure includes transmitting an access message carrying a buffer status report (BSR) medium access control element (MAC CE).

14. The method of claim 1, wherein the performing the access procedure mode is further selected using a capability of the wireless device.

15. A wireless communication apparatus, comprising:
at least one processor configured to:
select, based on a field in a message received by the wireless communication apparatus, an access procedure mode for accessing a wireless network upon occurrence of a condition, wherein the condition includes a buffer status report being triggered and a scheduling request delay timer being not running; and
perform, upon occurrence of the condition, the access procedure according to the access procedure mode for accessing the wireless network.

16. The wireless communication apparatus of claim 15, wherein the access procedure mode is a scheduling request access mode or a 2-step random access mode.

17. The wireless communication apparatus of claim 15, wherein the message is a radio resource control (RRC) message.

18. The wireless communication apparatus of claim 17, wherein the message is included in an RRC setup message.

19. The wireless communication apparatus of claim 17, wherein the message is included in an RRC reestablishment message.

20. The wireless communication apparatus of claim 17, wherein the message is included in an RRC configuration message.

* * * * *